United States Patent
Goluboff

(10) Patent No.: US 9,578,857 B2
(45) Date of Patent: Feb. 28, 2017

(54) HARNESS FOR PETS

(71) Applicant: Mariana Goluboff, Buenos Aires (AR)

(72) Inventor: Mariana Goluboff, Buenos Aires (AR)

( * ) Notice: Subject to any disclaimer, the term of this patent is extended or adjusted under 35 U.S.C. 154(b) by 0 days.

(21) Appl. No.: 14/878,502

(22) Filed: Oct. 8, 2015

(65) Prior Publication Data
US 2016/0021852 A1  Jan. 28, 2016

Related U.S. Application Data

(63) Continuation-in-part of application No. 14/107,114, filed on Dec. 16, 2013, now abandoned.

(51) Int. Cl.
*A01K 27/00* (2006.01)
*A01K 13/00* (2006.01)
*A61D 9/00* (2006.01)

(52) U.S. Cl.
CPC .......... *A01K 27/002* (2013.01); *A01K 13/006* (2013.01); *A01K 27/003* (2013.01); *A61D 9/00* (2013.01)

(58) Field of Classification Search
CPC .................................................. A01K 27/002
USPC ................ 119/863, 792; D30/151, 152
See application file for complete search history.

(56) References Cited

U.S. PATENT DOCUMENTS

| | | | | |
|---|---|---|---|---|
| 6,443,101 B1 * | 9/2002 | Fazio | ................... | A01K 27/002 119/792 |
| 7,325,516 B2 * | 2/2008 | Moore | ................. | A01K 27/002 119/497 |
| D633,257 S * | 2/2011 | Trias | ............................ | D30/145 |
| D673,738 S * | 1/2013 | Lanzendorf | .................. | D30/145 |
| 2005/0173479 A1* | 8/2005 | Gentil | .................. | A47D 13/025 224/158 |
| 2007/0204378 A1* | 9/2007 | Behar | .................... | A41D 13/01 2/69 |
| 2008/0223311 A1* | 9/2008 | Ito | ......................... | A01K 27/002 119/792 |
| 2010/0147230 A1* | 6/2010 | Kosanke | .............. | A01K 27/002 119/856 |
| 2010/0263602 A1* | 10/2010 | Cho | ...................... | A01K 27/002 119/792 |
| 2011/0290199 A1* | 12/2011 | Ramirez | ............... | A01K 27/002 119/792 |
| 2012/0260392 A1* | 10/2012 | Votel | ..................... | A41D 13/065 2/24 |

FOREIGN PATENT DOCUMENTS

JP  WO 2013084841 A1 *  6/2013 ........... A01K 27/002

* cited by examiner

*Primary Examiner* — Monica Williams
(74) *Attorney, Agent, or Firm* — Defillo & Associates, Inc.; Evelyn A Defilló

(57) ABSTRACT

A harness for pets that allows them to move freely, without causing them damage or possible wounds, thanks to a piece of laminar textile material composed of a central part with front vertexes and rear vertexes which project themselves to define both ears with complementary connection clasps, and both parts of the belt with complementary fasteners, and the central part shows an opening on one of the sides of the center of the part, while on the other side there is a girdle with fasteners for a leash.

6 Claims, 5 Drawing Sheets

HARNESS FOR PETS

CROSS REFERENCE TO RELATED U.S. APPLICATION

This application is a continuation-in-part of patent application Ser. No. 14/107,114, filed Dec. 16, 2013, entitled, HARNESS FOR PETS, pending, the disclosure of which is incorporated herein by reference.

FIELD OF THE INVENTION

This invention is related to the field of accessories for pet care, such as dogs and cats, and especially refers to a harness for pets that guarantees an effective fastening of the pet without causing body damage or muscle discomfort or pain in the animal.

BACKGROUND ART

The walking leashes and collars, as well as the harnesses made of a set of leashes, are well-known in the business of pet care and possession. So, those harnesses that are made of a band that fastens the body of the animal, a dog, for example, by taking it from its neck, under the arms or legs and around its elbows are well-known. In another embodiment, the bands are passed to fasten the animal from its cross or back, abdomen and chest, in which said harness is provided with a buckle or ring that allows the leash to be tied. Said harnesses with bands are adjustable, i.e., they may be adjusted to the size of each kind of animal; they are usually light and especially cheap, so that any person may buy them. However, as they are made of thin bands, these bands have a very small contact surface with the animal, and because of the material they are made of, they cause wounds in the hair, the armhole and especially, they damage the back, since said harness with a band is neither anatomical nor ergonomic.

Another well-known embodiment is the "hybrid"-type harness, which has a front combined with the bands of the kind described in the previous embodiment. In this kind of harness, the front is placed on the animal's chest, and the bands are fastened and passed around the neck and chest. The hybrid harness is also adjustable and light. However, its cost is higher than that of the harness with a band, and like the latter, it has a small contact surface, and because of the material it is made of, it causes damage to the animal's hair, hurting the armhole and causing wounds in its back because it is not anatomical.

In another embodiment, the harness is composed of a front with an upper and a lower part, where the lower part is placed on the pet's chest, while the upper part leans against the back of the animal, and both the upper and the lower part are connected by means of portions that extend and cover part of the back and the chest. In this way, by having a front, the harness has a bigger contact surface, and at the same time, it is light and adjustable. However, even if it provides a bigger contact surface, there are a number of inconveniences, for example, the lack of flexibility of the front which limits the movements performed by the animal every day. In which, said upper part of the front, mostly covers the whole of the animal's back, and therefore, it is not a very anatomical model, that finally ends up hurting the animal's back.

Summarizing, the conventional harnesses show a number of inconveniences that damage the pet's health, particularly when the owner of the pet pulls the harness and this action hurts any part of the animal, which may be the armhole, the back, the chest or the legs. Likewise, the design they show is hardly favorable for the pets, since they either hurt their hair and health, or do not allow pets to move freely according to their needs.

Considering the present state of the technique available for harnesses for pets, and with the purpose of avoiding pain or discomfort and possible body damage in the animals, as it was described above, it would be very convenient to have a new harness for pets, which is made to solve the inconveniences of the conventional harnesses.

BRIEF DESCRIPTION OF THE INVENTION

Therefore, it is one of the purposes of this invention to provide a new harness for pets, made to avoid discomfort or possible body damage in animals, by eliminating the inconveniences caused by conventional harnesses.

Another objective of this invention is to provide an anatomical harness for pets that gives them more freedom in their movements, without hurting their back, armhole and legs.

Another objective of this invention is to provide a harness for pets that are overweight or have back problems, which prevents them from making big movements when they raise their legs.

Another objective of this invention is to provide a harness for pets that is made to cushion satisfactorily the effects provoked by the forces applied when the owner of the pet pulls the leash. Another objective of this invention is to provide a harness for pets made of a piece of laminar textile material composed in general by a central part with front vertexes and rear vertexes and the relevant ears with complementary connection clasps project themselves from said front vertexes and the relevant parts of the belt with complementary fastening methods also project themselves from these front vertexes, and said central part shows an opening laid out on one side of the center of said part while a girdle with the fastening for a leash is laid out on the opposite side.

BRIEF DESCRIPTION OF THE DRAWINGS

To clarify and understand better the purpose of this invention, it has been illustrated with several figures, in which this invention has been represented in one of the preferred embodiments, all of which is to be considered just an example, in which:

FIG. 6b shows a back view of the harness of FIG. 6a;

FIG. 7a shows an exploded view of the hardness of FIG. 6a;

FIG. 7c shows a detailed view of the fastening device of the harness of FIG. 6a.

DETAILED DESCRIPTION OF THE INVENTION

Figure 1:
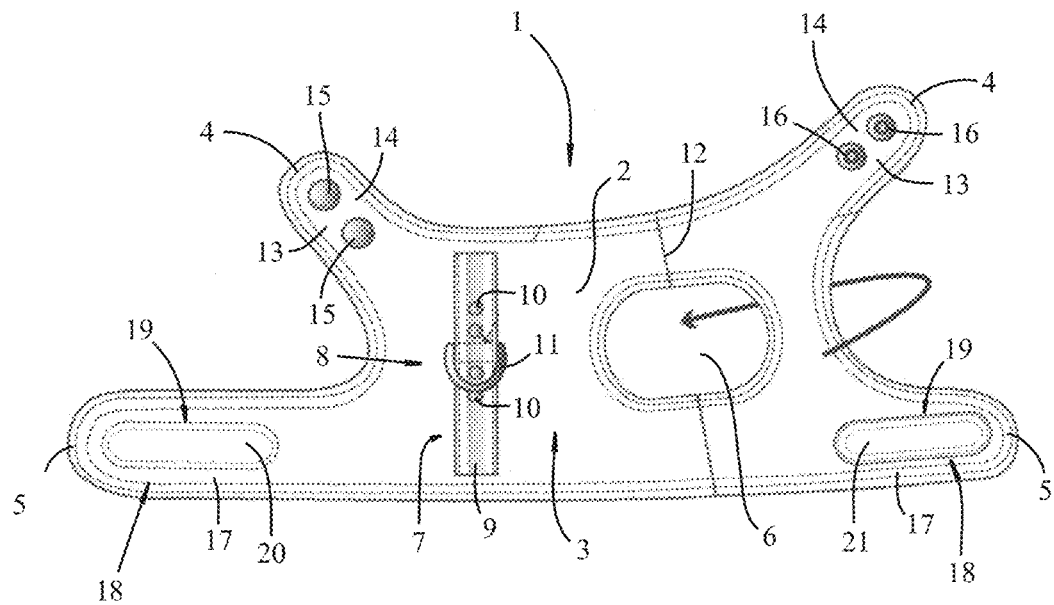
FIG. 1 shows a front view of the harness according to the invention showing the harness in an unfolded position and seen from its outer surface, i.e., that one which is not against the animal's body.
Figure 2:
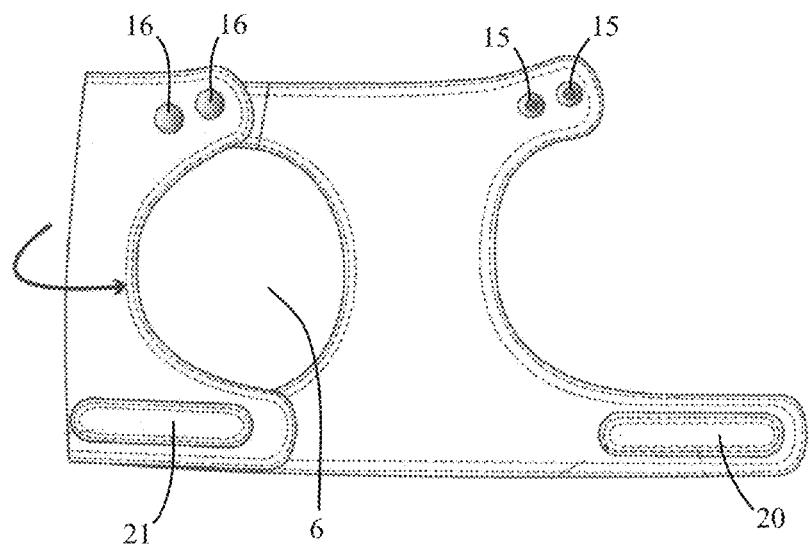
FIG. 2 shows a front view of the harness in FIG. 1 showing the harness in an intermediate folding position.

Referring to the Figures, the present invention includes a harness for pets that has been designed to save the inconveniences caused by conventional harnesses as regards to the discomfort and possible wounds and/or damage they cause to pets, particularly, on the back, armhole, legs, chest, etc. Likewise, the design of the harness of the present invention allows the animal to move its head and legs freely, softening the forces applied when the leash is pulled.

Referring to FIGS. 1 to 4, a harness 1 for pets, said harness 1 is made of a unitary piece (single piece) of laminar textile material having a central section 3. The central section 3 includes front vertexes 4 and back vertexes 5. The central part 3 has generally a quadrangular shape.

The pet harness 1 may be constructed in a wide variety of sizes and style variations to fit various animals such as dogs and cats. It is understood that the pet harness 1 may also have artistic decorations thereon without departing from the scope of this disclosure.

Figure 5A:
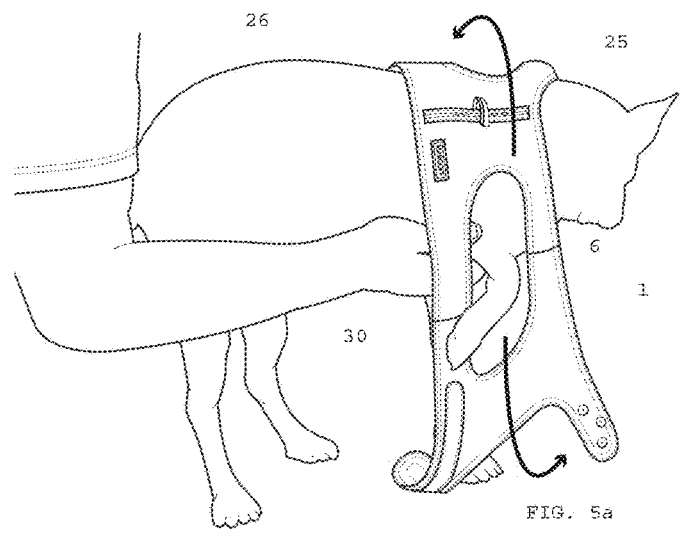
FIG. 5a shows a schematic view showing a pet introducing its legs through a central hole located on the harness of FIG. 1.

An opening 6 is located on one side of the center of said the central section 3. The opening 6 has an oblong shape and is adapted to receive a front leg 30 of the pet 25 (See FIG. 5a). The size of the opening 6 may depend on the width of the chest of the pet 25.

A girdle 7 is located on the opposite side of the central section 3. The girdle 7 includes a fastening device 8 adapted to be hooked into a leash.

The girdle 7 includes a central line 9 made of a reflective band, which extends lengthwise. The girdle 7 is on an intermediate part and includes several fastening clasps 10 to secure the girdle 7 with the central section 3. A reinforcing seam may be provided to the joining of both parts.

A buckle 11 may be secured to the girdle 7. The buckle 11 is designed to receive a fastening device of a leash. The buckle 11 may be a half-round buckle.

Figure 5B:
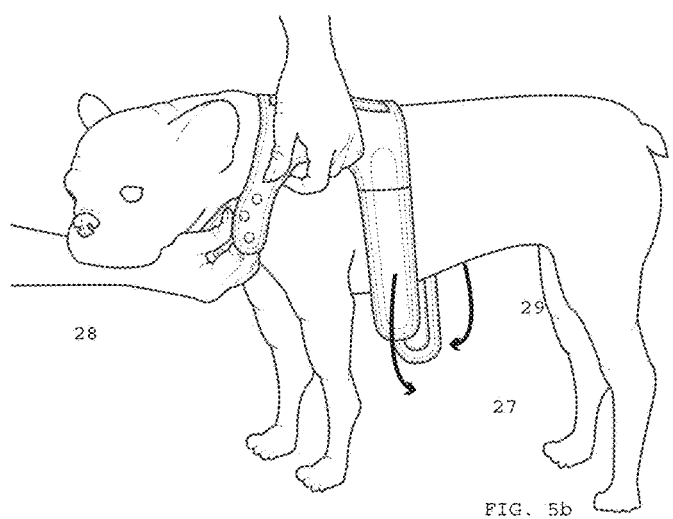
FIG. 5b shows a schematic view showing the front vertexes being fastened around the neck of the pet.
Figure 5C:
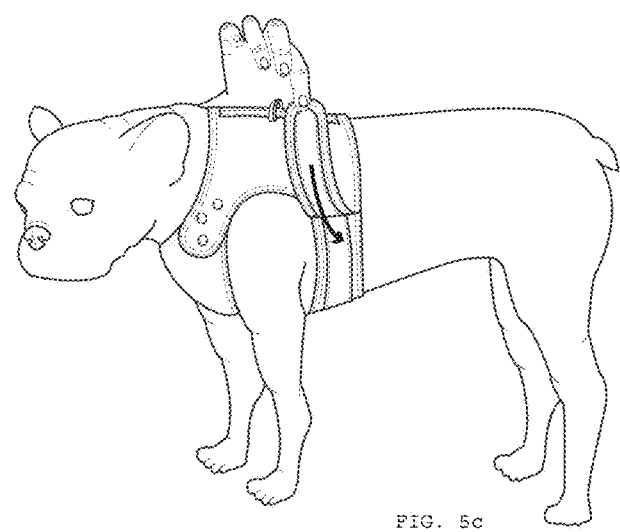
FIG. 5c shows a schematic view showing the back vertexes being fastened around the neck of the pet.
Figure 6A:
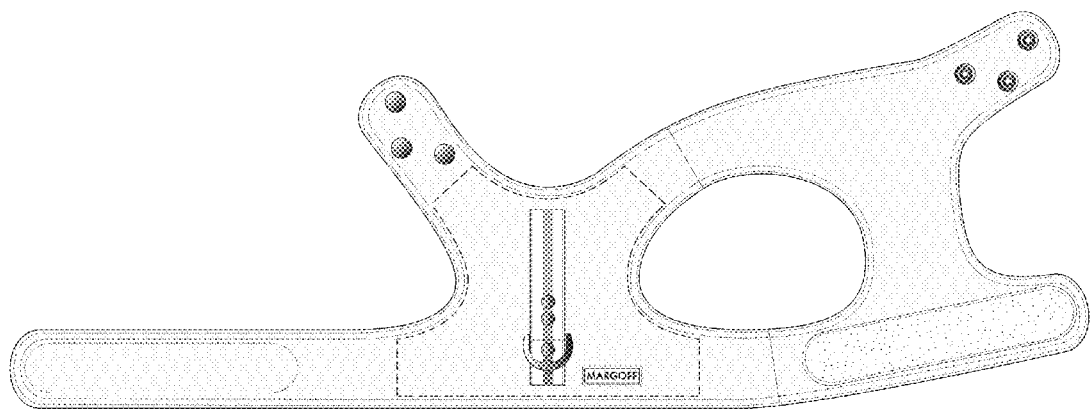
FIG. 6a shows a front view of a harness according to another embodiment of the present invention.
Figure 6B:
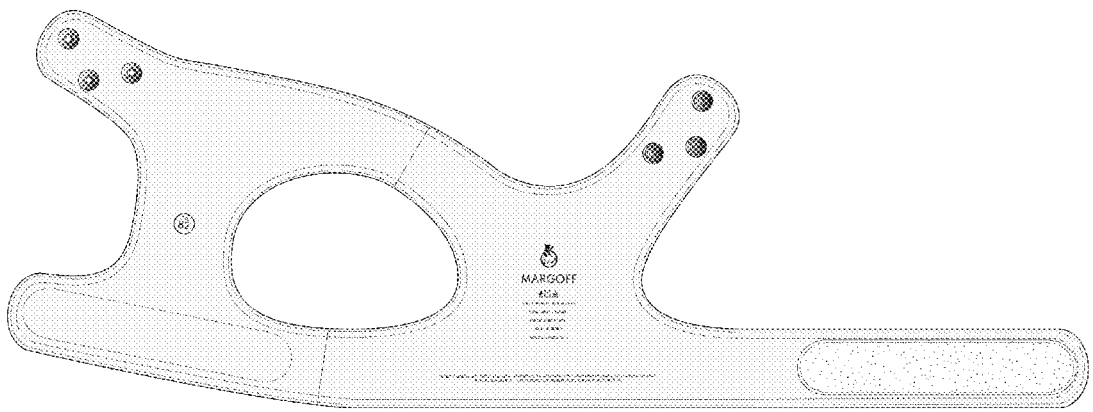
Figure 7A:
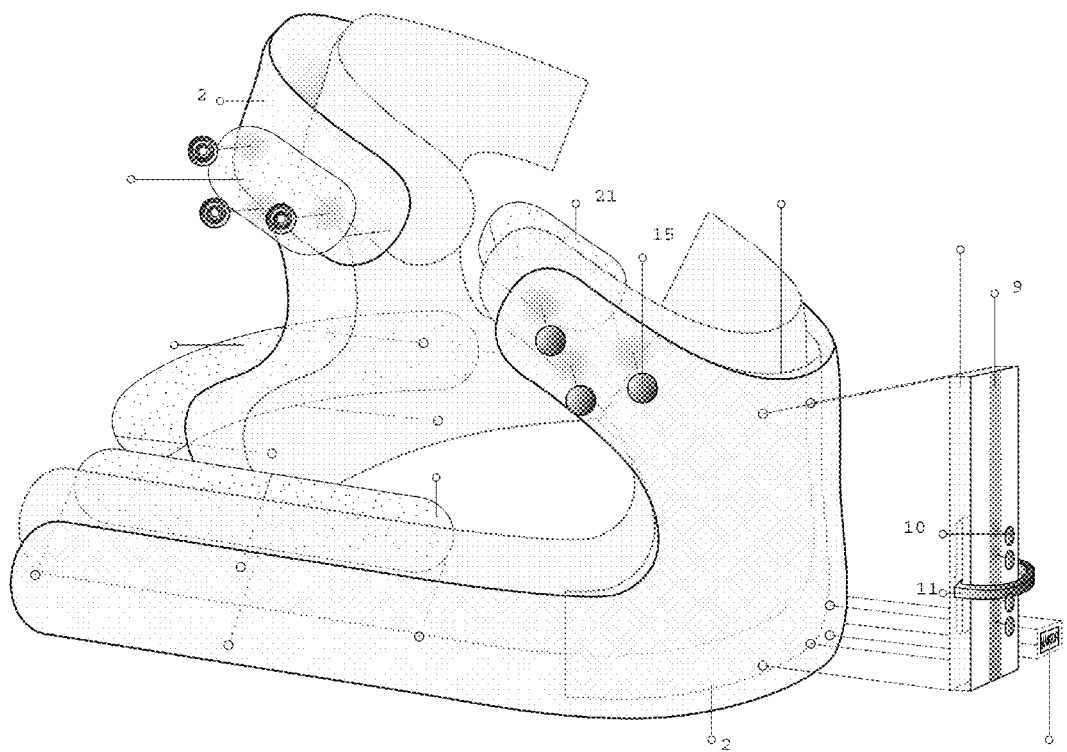
Figure 7B:
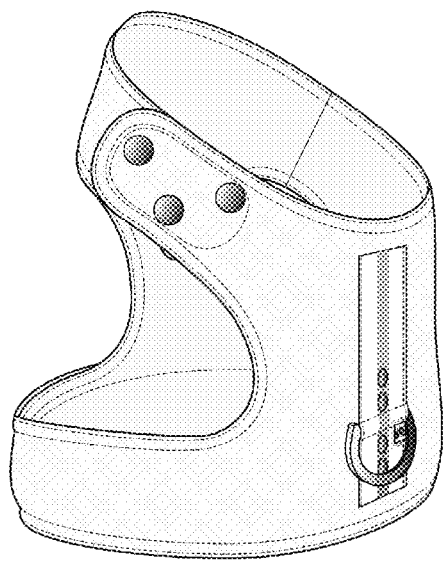
FIG. 7b shows a perspective front view of the harness of FIG. 6a in a folded position.
Figure 7C:
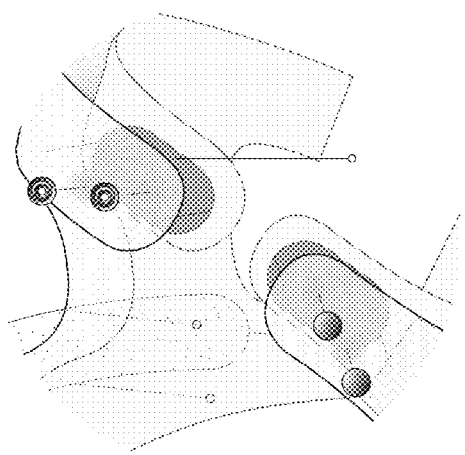

A linking crossing line 12 may be located on the central section 3. The linking crossing line 12 is designed to be placed between the thorax 27 and the back 26 of the pet 25 when the pet harness 1 is in a working or folded position. (See FIGS. 5a-5c)

Each one of the front vertexes 4 extend angularly from the central section 3 forming ears 13. The ears 13 include connection clasps 14, with male clasps 15 and female clasps 16 respectively. The front vertex 4 are adapted to be wrapped around the neck 28 of the pet 25 and secured to the neck 28 by interconnecting the male clasps 14 with the female clasps 16 in the working position. This does not mean that the invention is limited to having clasps of the same kind in one ear, but that the combination of at least one male clasp with at least one female clasp laid out in the same ear may also be considered.

The connection clasps 14 may be of the nickel plated type or black, and the quantity in stock shall depend on the size of the animal, i.e., on the size used, which means that there may be a variation between one to three clasps laid out in each ear 13.

Each one of the back vertexes 5 are linearly extended from the central section 3 forming ears 17. The ears 17 include fastener devices 18. The fasteners 18 may be, for example a "Velcro"®-type fortified material clasp 19, which resists the force caused by the action of pulling the leash, and they are defined as male clasp 20 and female clasp 21.

The back vertex 5 are adapted to be wrapped around the belly 29 of the pet 25 and secured to the belly 29 by interconnecting the male clasps 20 with the female clasps 21 in the working position.

As regards to the material of the laminar piece 2, its outer side is composed of a 3D Aired Mesh known in the market as "3D Air Mesh", whereas its inner side is made of synthetic fibers such as elastane, known in the market as "Lycra"®. In this way, the pet manages to release the perspiration satisfactorily, and move; and thanks to the capacity of the material to stretch, the air mesh absorbs the pulling force. At the same time, the laminar piece 2 is lined and may show in a part the label of the marketing company and the recommendations for washing, where it has been manufactured, etc. In a discontinuous line, the figure shows the backstitches or seam in the fabric to join the linen with the outer and inner materials, and the color of the backstitching is similar to that of the linen.

Figure 3:
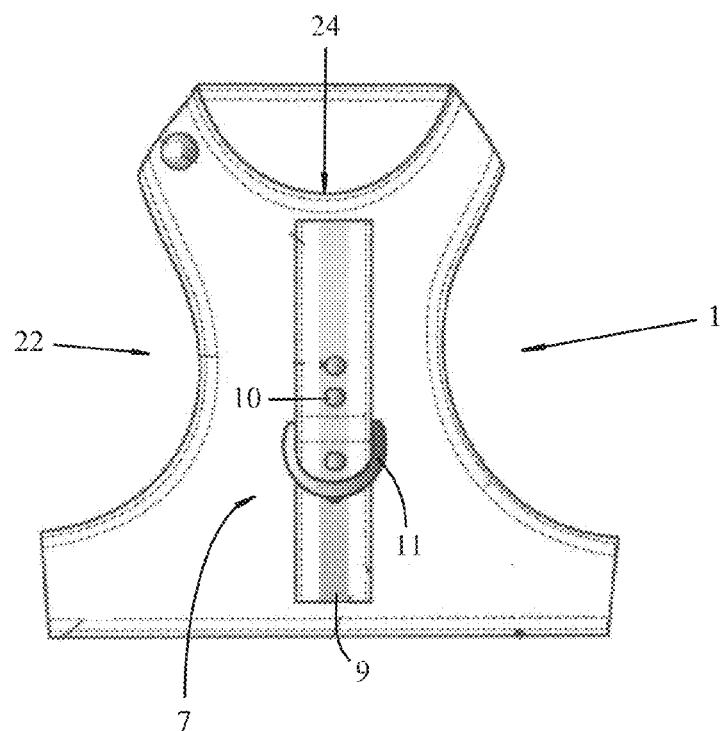
FIG. 3 shows a top view of the harness of FIG. 1 showing the harness in a totally folded position and seen from the back of the animal.
Figure 4:
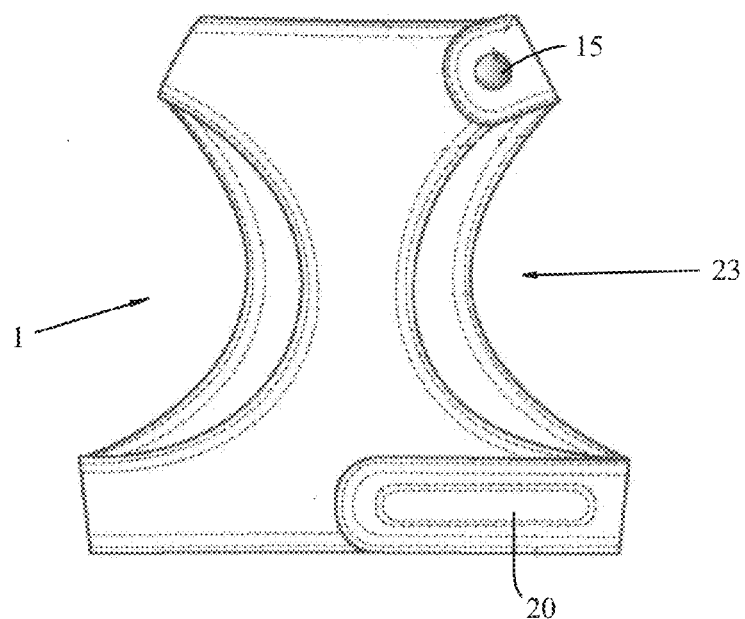
FIG. 4 shows a back view of the harness of FIG. 1 showing the harness in a totally folded position and seen from the thorax of the animal.

Referring to FIGS. 3 and 4, we can see the harness for pets 1 of this invention, already assembled. For such a purpose, the relevant parts should be folded as it is indicated with the arrows, and therefore forming the model in the figure. In this way, two parts are defined, an upper part 22 and a lower part 23, and the upper part 22 is placed with the girdle 7 on the back of the pet, while the lower part 23 is on the pet's chest. In FIG. 3, there is an armhole, and a low-cut neck 24 that allows the free movement of the head and legs of the pet.

In this way, the harness for pets of this invention is formed and made to save the inconveniences caused by conventional harnesses, as regards to the wounds and possible damage they cause to pets. Wherein, the material of the laminar piece 2 of the harness of this invention allows the exact stretching without losing the shape, softening the forces caused by the owner when he/she pulls the leash.

In turn, the correct location of the buckle 11 prevents the owner from hurting the pet when he/she pulls the leash. Besides, as it is an anatomical and ergonomic model, it suitably accompanies the amplitude of the movements, without hurting the pet, and the contact surface of the garment with the dog is minimum, but enough to guarantee the integrity and functionality of the harness. Having especially described and determined the nature of this invention and the way in which it should be put into practice, we do hereby claim the ownership and exclusive right of:

What is claimed is:

1. A harness for pets comprising:
  a unitary piece of laminar textile material, the unitary piece of laminar textile material including a first section, a central section, a second section, an inner side, and an outer side, the first section being opposite to the second section;
  the unitary piece of laminar textile material laterally extends forming a first front vertex on the first section and a second front vertex on the second section, the first front vertex extends angularly from the central section forming a first front ear which includes a first set of connecting devices, the second front vertex extends angularly from the central section forming a second front ear which includes a first set of connecting devices, the first front vertex and the second front vertex are adapted to be wrapped around a neck of the pet;

the unitary piece of laminar textile material laterally extends forming a first back vertex on the first section and a second back vertex on the second section, the first back vertex extends angularly from the central section forming a first back ear which includes a first set of connecting devices, the second back vertex extends angularly from the central section forming a second back ear—which includes a second set of connecting devices, the back vertexes are adapted to be wrapped around a belly of the pet;

an opening located on the first section of the piece of laminar textile material, the opening having an oblong shape, the opening is adapted to receive a front leg of the pet;

a girdle with fasteners located on the second section of the piece of the laminar textile material, wherein the girdle is adapted to be connected to a leash;

wherein in a working position, the front leg of the pet is introduced through the opening, then the front vertexes are wrapped around the neck of the pet and secured to the neck by interconnecting the first set of connecting devices and the back vertexes are wrapped around the belly of the pet and secured to the belly by interconnecting the second set of connecting devices and wherein a hole for a second leg of the pet is created when the front vertexes are brought together.

2. The harness for pets according to claim 1, further including a vertical linking crossing line located near a central point of the opening, the linking crossing line is designed to be placed between a thorax and a back of the pet—when the pet harness is in the working position.

3. The harness according to claim 1, wherein the girdle includes a fastening device adapted to be hooked into a leash.

4. The harness according to claim 3, wherein said fastening device is a buckle.

5. The harness according to claim 1, wherein the laminar textile material has a linen.

6. A harness for pets comprising:
a unitary piece of laminar textile material, the unitary piece of laminar textile material including a first section, a central section, a second section, an inner side, and an outer side, the first section being opposite to the second section;

the unitary piece of laminar textile material laterally extends forming a first front vertex on the first section and a second front vertex on the second section, the first front vertex extends angularly from the central section forming a first front ear which includes a first set of connecting devices, the second front vertex extends angularly from the central section forming a second front ear which includes a first set of connecting devices, the first front vertex and the second front vertex are adapted to be wrapped around a neck of the pet;

the unitary piece of laminar textile material laterally extends forming a first back vertex on the first section and a second back vertex on the second section, the first back vertex extends angularly from the central section forming a first back ear which includes a first set of connecting devices, the second back vertex extends angularly from the central section forming a second back ear which includes a second set of connecting devices, the back vertexes are adapted to be wrapped around a belly of the pet;

an opening located on the first section of the piece of laminar textile material, the opening having an oblong shape, the opening is adapted to receive a front leg of the pet;

a girdle with fasteners located on the second section of the piece of the laminar textile material, wherein the girdle is adapted to be connected to a leash;

wherein in a working position, the front leg of the pet is introduced through the opening, then the front vertexes are wrapped around the neck of the pet and secured to the neck by interconnecting the first set of connecting devices and the back vertexes are wrapped around the belly of the pet and secured to the belly by interconnecting the second set of connecting devices and wherein a hole for a second leg of the pet is created when the front vertexes are brought together;

wherein the outer side of the unitary piece of the laminar textile material is made of a 3D aired mesh material and the inner side is made of an elastane material.

\* \* \* \* \*